(12) United States Patent
Beavers et al.

(10) Patent No.: US 10,854,028 B2
(45) Date of Patent: Dec. 1, 2020

(54) AUTHENTICATION FOR KEYLESS BUILDING ENTRY

(71) Applicant: Vivint, Inc., Provo, UT (US)

(72) Inventors: Timothy Ryan Beavers, West Jordan, UT (US); Jason Carter, Lehi, UT (US); Daniel McCallum, Lehi, UT (US); Michael Allen Tupy, Farmington, MN (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/232,720

(22) Filed: Aug. 9, 2016

(65) Prior Publication Data

US 2018/0047227 A1   Feb. 15, 2018

(51) Int. Cl.
*G06F 21/44* (2013.01)
*H04N 7/18* (2006.01)
(Continued)

(52) U.S. Cl.
CPC .............. *G07C 9/257* (2020.01); *G06F 21/32* (2013.01); *G06F 21/35* (2013.01); *G06F 21/40* (2013.01);
(Continued)

(58) Field of Classification Search
CPC ........ G06F 21/35; G06F 21/604; G06F 21/31; G06F 21/44; G06F 21/45; G07C 2009/00769; G07C 2009/00793; G07C 2009/00928; G07C 2209/64; G07C 9/00007; G07C 9/00031; G07C 9/00103; G07C 9/00111; G07C 9/00174; G07C 9/00309; G07C 2209/04; G07C 9/00087; G07C 9/00563; G07C 9/00571; G07C 2009/00412; G07C 2009/00865; G07C 2209/63; G07C 9/00039; G07C 9/00896; G07C 9/20; G07C 9/22; G07C 9/27; G07C 9/28; G07C 9/257; G07C 9/23; G07C 9/37; H04B 1/3822; H04L 63/08; H04L 63/102; H04L 12/1831; H04L 29/08558; H04L 43/10; H04L 63/0861; H04L 63/10; H04L 63/20; H04L 67/1002; H04L 67/1008; H04L 67/101; H04L 67/1012; H04L 67/1023; H04L 67/12; H04L 67/125; H04L 67/22; H04L 67/26; H04L 67/306;
(Continued)

(56) References Cited

U.S. PATENT DOCUMENTS 6,992,562 B2   1/2006   Fuks et al.
7,110,744 B2   9/2006   Freeny, Jr.
(Continued)

OTHER PUBLICATIONS

Ringdale, Networked Building Access Control and Home Automation Systems, available at least as early as Dec. 23, 2008.

*Primary Examiner* — Dionne Pendleton
(74) *Attorney, Agent, or Firm* — Holland & Knight, LLP

(57) ABSTRACT

Systems and methods for controlling access to a building associated with a security and/or automation system may include detecting a presence of at least one person positioned proximate an entry to the building, collecting one or more biometric identifiers from the at least one person, identifying one or more devices within a predetermined proximity of the entry to the building, and granting the person access to the building based at least in part on the collecting and the identifying.

19 Claims, 12 Drawing Sheets

(51) Int. Cl.
  *G07C 9/25* (2020.01)
  *G07C 9/00* (2020.01)
  *G07C 9/28* (2020.01)
  *H04L 29/06* (2006.01)
  *G06F 21/35* (2013.01)
  *G06F 21/32* (2013.01)
  *G06F 21/40* (2013.01)

(52) U.S. Cl.
  CPC ..... *G07C 9/00174* (2013.01); *G07C 9/00563* (2013.01); *G07C 9/00571* (2013.01); *G07C 9/28* (2020.01); *H04L 63/0861* (2013.01); *H04L 63/10* (2013.01); *H04L 63/102* (2013.01); *H04L 63/105* (2013.01); *G07C 2209/04* (2013.01); *G07C 2209/64* (2013.01)

(58) Field of Classification Search
  CPC ...... H04L 63/105; H04L 67/34; H04W 12/06; H04W 12/08; H04W 4/008; H04W 76/02; H04W 76/023; H04W 84/12; H04W 84/18; H04W 4/80; H04W 76/10; H04W 76/14; H04W 28/08; H04W 48/02; H04W 48/16; H04W 4/029; H04W 4/38; H04W 12/0804; H04W 12/0608; H04W 12/0609; H04W 12/0802; H04W 4/021; H04W 4/12; H04W 4/16; H04W 4/70; A23V 2200/334; G08B 13/19645; G08B 13/19695; G08B 21/0269; G08B 21/22; G08B 25/14; G08B 13/19643; G08B 13/1966; G08B 13/19667; G08B 13/19697; G10L 15/16; G10L 15/187; G10L 15/22; G10L 15/26; G10L 15/30; G10L 17/22; G10L 2015/223; G07F 7/1008; G07F 7/1025; H04N 7/181; H04N 5/265; G06Q 20/3224; G06Q 20/341; G06Q 20/40; G06Q 20/401; G06Q 20/4016; G06Q 20/40975; G06Q 30/0185; G06Q 30/06; G06Q 30/0601; G06Q 40/00

See application file for complete search history.

(56) References Cited

U.S. PATENT DOCUMENTS

| | | | |
|---|---|---|---|
| 2004/0155771 A1* | 8/2004 | Ergun | G07C 9/00182 340/531 |
| 2007/0252001 A1 | 11/2007 | Kail et al. | |
| 2008/0028230 A1 | 1/2008 | Shatford | |
| 2008/0120195 A1* | 5/2008 | Shakkarwar | G06Q 20/341 705/318 |
| 2015/0169864 A1* | 6/2015 | Lin | G06F 21/45 726/6 |
| 2015/0228134 A1* | 8/2015 | Tehranchi | G07C 9/00111 340/5.61 |
| 2016/0277380 A1* | 9/2016 | Wagner | H04L 63/0861 |
| 2017/0134698 A1* | 5/2017 | Mahar | G08B 13/19697 |
| 2017/0163750 A1* | 6/2017 | Sullivan | H04L 67/22 |
| 2017/0245124 A1* | 8/2017 | Child | H04W 4/12 |

* cited by examiner

AUTHENTICATION FOR KEYLESS BUILDING ENTRY

BACKGROUND

The present disclosure, for example, relates to security and/or automation systems, and more particularly to authenticating persons for purposes of keyless building entry using a security and/or automation system.

Security and automation systems are widely deployed to provide various types of communication and functional features such as monitoring, communication, notification, and/or others. These systems may be capable of supporting communication with a user through a communication connection or a system management action.

With the wide-spread use of computers and mobile devices has come an increased presence of home automation and security products. Home automation and security products can fully automate aspects of a residence and/or business. For example, home automation and security products may use biometric identifiers among other device identifiers to unlock and/or automatically open a door to a building.

Most doors require one or more keys to unlock and permit entry of a person into the building. Some doors may be more sophisticated and use a key code, scan card, or other form of entry. However, scan cards and keys may be lost and key codes may be forgotten. Further, handling cards and keys and entering key codes may be difficult in some situations, such as when the user's hands are full.

SUMMARY

The present disclosure is directed to systems and methods for authenticating persons as part of granting access to a building or property. In at least some embodiments, the authenticating may be conducted in a way that eliminates the need for a key, card or other device that must be manually operated by the person to gain access to the building or property. The authenticating may include two or more authenticating steps and/or inputs. In some examples, the authenticating may include one or more biometric identifiers, such as facial recognition, voice recognition, thumbprint, fingerprint, palm print, and retina scan. The authenticating may include identification of an electronic device carried by or in some way associated with the person attempting to gain access to the building or property. The electronic device may include, for example, a smart phone, a fab, an access card, a tablet computer, or the like.

The authenticating may also include identifying the presence of the person at an access point to the building or property. The presence may be identified in a number of ways, including motion detection, facial recognition or collection of other biometric identifiers, or presence of a computing device. The system may include a database of registered users of the property who have been granted various access rights and/or permissions. Information about at least one of the detected biometric identifiers and/or detected devices may be checked against information in the database to determine whether the person should be granted access to the building or property.

In one embodiment, a computer-implemented method for controlling access to a building associated with a security and/or automation system includes detecting a presence of at least one person positioned proximate an entry to the building, collecting one or more biometric identifiers from the at least one person, identifying one or more devices within a predetermined proximity of the entry to the building, and granting the person access to the building based at least in part on the collecting and the identifying.

In one example, the method further includes creating a user profile, wherein the user profile comprises at least one biometric identifier and one device. The method may include searching a user profile database based at least in part on the collecting and identifying, and locating the user profile that matches the one or more biometric identifiers and the one or more devices. The method may include determining a level of access to the building based at least in part on the locating. The method may include denying access to the building based at least in part on the determining.

The one or more biometric identifiers may include at least one of facial recognition, voice recognition, thumbprint, fingerprint, palm print, and retina scan. Identifying one or more devices may include using at least one of WiFi, radio frequency identification (RFID), geo location, and BLUETOOTH® technology. The identifying may occur before the collecting. The collecting may include collecting at least two biometric identifiers. The collecting may be performed with at least one device positioned proximate a doorbell of the building. Granting the person access to the building may include at least one of unlocking a door and opening a door.

Another embodiment is directed to an apparatus for controlling access to a building associated with a security and/or automation system. The apparatus includes a processor, memory in electronic communication with the processor, and instructions stored in the memory. The instructions are executable by the processor to collect one or more biometric identifiers from a person positioned at an entry to the building, identify one or more devices carried by the person, and grant the person access to the building based at least in part on the collected one or more biometric identifiers and the identified one or more devices.

In one example, the instructions may be executable by the processor to collect the one or more biometric identifiers using at least one of a camera, a scanner, and a microphone. The instructions may be executable by the processor to identify one of more devices using at least one of WiFi, radio frequency identification (RFID), geo location, and BLUETOOTH® signals. The one or more biometric identifiers may include at least one of facial recognition, voice recognition, thumbprint, fingerprint, palm print, and retina scan. The instructions may be executable by the processor to collect one or more biometric identifiers before identifying one or more devices. The instructions may be executable by the processor to collect one or more biometric identifiers after identifying one or more devices. The instructions may be executable by the processor to detect presence of the person before collecting the one or more biometric identifiers.

A further embodiment is directed to a non-transitory computer-readable medium storing computer-executable code for controlling access to a building associated with a security and/or automation system. The code is executable by a processor to detect a presence of at least one person positioned proximate an entry to the building, collect one or more biometric identifiers from the at least one person, identify one or more devices within a predetermined proximity of the entry to the building, and grant the person access to the building based at least in part on the collecting and the identifying. In one example, the code may be executable by a processor to detect the presence concurrently with collecting one or more biometric identifiers.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
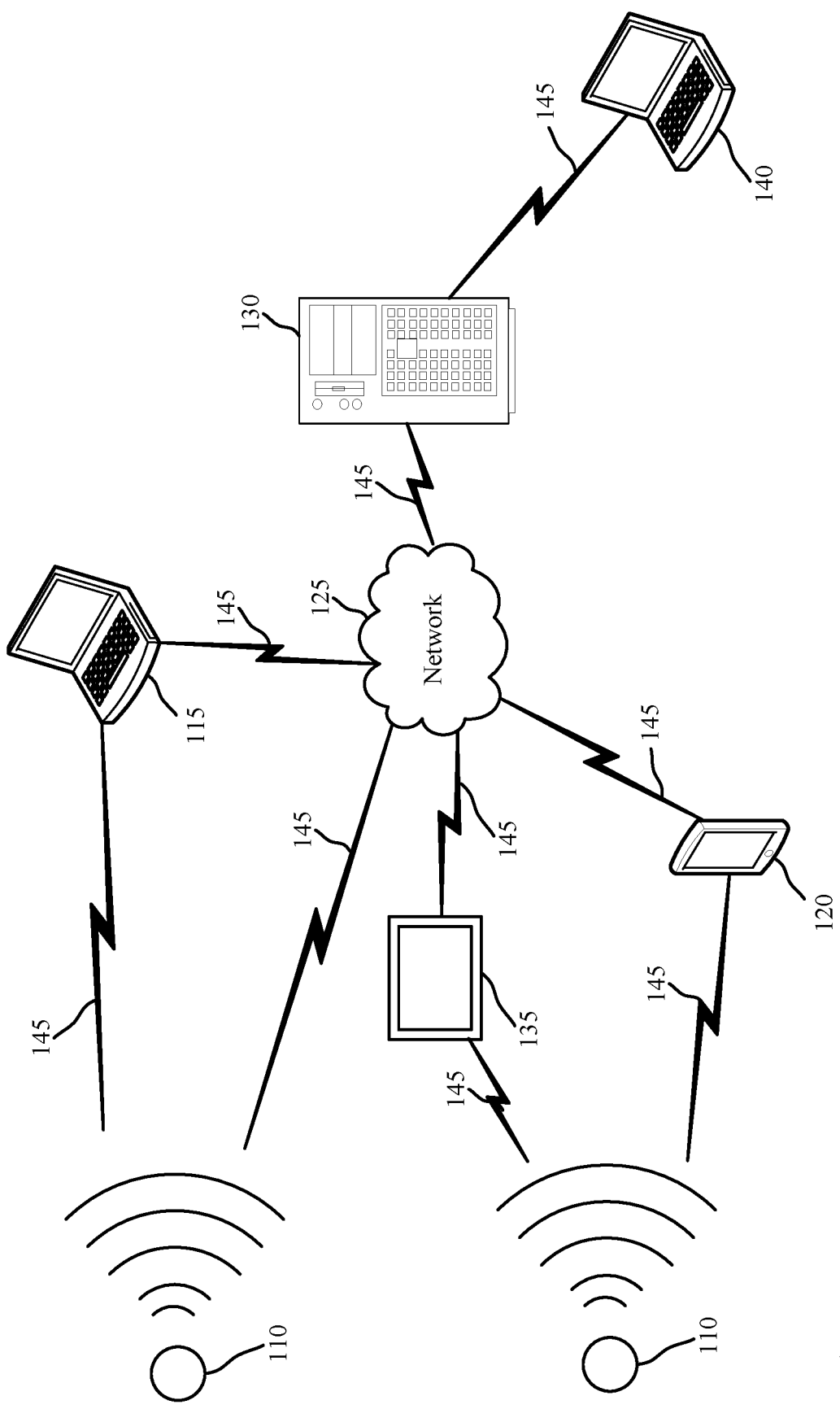
FIG. 1 is a block diagram of an example of a security and/or automation system in accordance with various embodiments.

The present disclosure relates to systems and methods for keyless authentication to a building using, for example, either one of or a combination of biometric identifiers and device recognition. In some embodiments, a security and/or automation system may be equipped to recognize one or more biometric identifiers and use those biometric identifiers to provide access to a building or property. The biometric identifiers may comprise, for example, facial recognition, voice recognition, thumbprint, fingerprint, palm print, retina or iris recognition, and similar human characteristics and traits.

The automation system may be equipped with a specific imagine capturing system to identify set biometric identifiers or a scanning technology to recognize a separate set of biometric identifiers. The image capturing system may be proximate one or more entries to a building and may be visible and/or hidden. The image capturing system may be integrated with a doorbell device of a building. A light or other visual indicator, speaker or display screen may provide communications to a user as part of collecting the biometric identifier (e.g., communication that the image capturing system is functioning and the user may stand appropriately to allow the image capturing system to recognize a biometric identifier of the person).

The automation system may additionally be equipped to detect one or more electronic devices associated with (e.g., carried by) the user. The electronic devices may comprise, for example, a mobile key, a key fab, a mobile computing device (e.g., smart phone), a mobile security hardware device, and the like. The automation system may detect when the device is within a predetermined distance of the geographic coverage area serviced by the automation system. For example, the device may be able to connect to a wireless network associated with the automation system and/or building/property. The automation system may recognize a unique identifier of the device.

The automation system may unlock and/or automatically open a barrier to the building or grounds upon recognition of one or more identifying features. For example, the automation system may be programmed with users and user profiles. The user profiles may define the level of access to a building and determine identifying characteristics to positively identify the user and grant the user access to the building. In some embodiments, more than one identifying characteristic may be required. For example, the automation system may have multiple identifying characteristics and may need to recognize at least two characteristics to ensure a positive identification for authentication purposes.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 is an example of a communications system 100 in accordance with various aspects of the disclosure. In some embodiments, the communications system 100 may include one or more sensor units 110, local computing device 115, 120, network 125, server 130, control panel 135, and remote computing device 140. One or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 130. In alternate embodiments, the network 125 may be integrated with any one of the local computing device 115, 120, server 130, or remote computing device 140, such that separate components are not required.

Local computing device 115, 120 and remote computing device 140 may be custom computing entities configured to interact with sensor units 110 via network 125, and in some embodiments, via server 130. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules.

Control panel 135 may be a smart home system panel, for example, an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 130, and network 125.

The local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 130.

In some embodiments, the one or more sensor units 110 may be sensors configured to conduct periodic or ongoing automatic measurements related to at least one of collecting biometric identifiers and detection of one or more electronic devices. Each sensor unit 110 may be capable of sensing multiple biometric identifiers and/or electronic devices, or alternatively, separate sensor units 110 may monitor separate biometric identifier parameters and/or electronic devices. For example, one sensor unit 110 may measure one or more biometric identifiers, while another sensor unit 110 (or, in some embodiments, the same sensor unit 110) may detect one or more electronic devices. In some embodiments, one or more sensor units 110 may additionally monitor alternate parameters, such as presence of one or more persons (e.g., persons located at or approaching an entry to a building or property).

Sensor units 110 may monitor a variety of biometric identifiers such as facial recognition, voice recognition, thumbprint, fingerprint, palm print, retina or iris recognition, blood type, and the like. In alternate embodiments, a user may input biometric identifier data directly at the local computing device 115, 120 or at remote computing device 140. For example, a user may enter fingerprint data into a dedicated application on his smart phone or a scanner located at the entry to the building or property.

Sensor units 110 may detect one or more electronic devices using various technologies, such as at least one of WiFi, radio frequency identification (RFID), geo location, BLUETOOTH® technology, and the like. In alternate embodiments, a user may input device identification data directly at the local computing device 115, 120 or at remote computing device 140. For example, a user may manually initiate transmission of a signal or message from an electronic device to a receiving device that is located at the entry to the building or property.

Data gathered by the one or more sensor units 110 may be communicated to local computing device 115, 120, which may be, in some embodiments, a wall-mounted input/output smart home display located at the entry to the building or property. In other embodiments, local computing device 115, 120 may be a personal computer or smart phone. In at least some embodiments, the local computing device 115, 120 may include a doorbell, a microphone, a speaker, a camera (e.g., video camera), or components of an intercom system.

Where local computing device 115, 120 is a smart phone, the smart phone may have a dedicated application directed to collecting biometric identifier data and/or electronic device identification data, and determining therefrom whether to grant access to the person. The local computing device 115, 120 may process the data received from the one or more sensor units 110 to obtain authentication of the person. In alternate embodiments, control panel 135 and/or remote computing device 140 may process the data received from the one or more sensor units 110, via network 125 and/or server 130, to obtain authentication information and determine what rights (e.g., access rights) to grant the person. Data transmission may occur via, for example, frequencies appropriate for a personal area network (such as BLUETOOTH® or IR communications) or local or wide area network frequencies such as radio frequencies specified by the IEEE 802.15.4 standard.

In some embodiments, local computing device 115, 120 may communicate with remote computing device 140 or control panel 135 via network 125 and server 130. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 130 may be configured to communicate with the sensor units 110, the local computing devices 115, 120, the remote computing device 140 and control panel 135. The server 130 may perform additional processing on signals received from the sensor units 110 or local computing devices 115, 120, or may simply forward the received information to the remote computing device 140 and control panel 135.

Server 130 may be a computing device operable to receive data streams (e.g., from sensor units 110 and/or local computing device 115, 120 or remote computing device 140), store and/or process data, and/or transmit data and/or data summaries (e.g., to remote computing device 140). For example, server 130 may receive a stream of biometric identifier data from a sensor unit 110, a stream of device identifier data from the same or a different sensor unit 110, and a stream of presence data from either the same or yet another sensor unit 110. In some embodiments, server 130 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 130. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 130 may include a database (e.g., in memory) containing biometric identifier data and/or device identification data received from the sensor units 110 and/or the local computing devices 115, 120. In some embodiments, the server 130 may include a database (e.g., in memory) containing user profiles for those persons who have permission to access the building or property. The user profiles may include biometric identifiers and/or electronic device information that the system can use as part of the authenticating process and determining what rights to grant a particular person. Additionally, as described in further detail herein, software (e.g., stored in memory) may be executed on a processor of the server 130. Such software (executed on the processor) may be operable to cause the server 130 to monitor, process, summarize, present, and/or send a signal associated with resource usage data.

Figure 2:
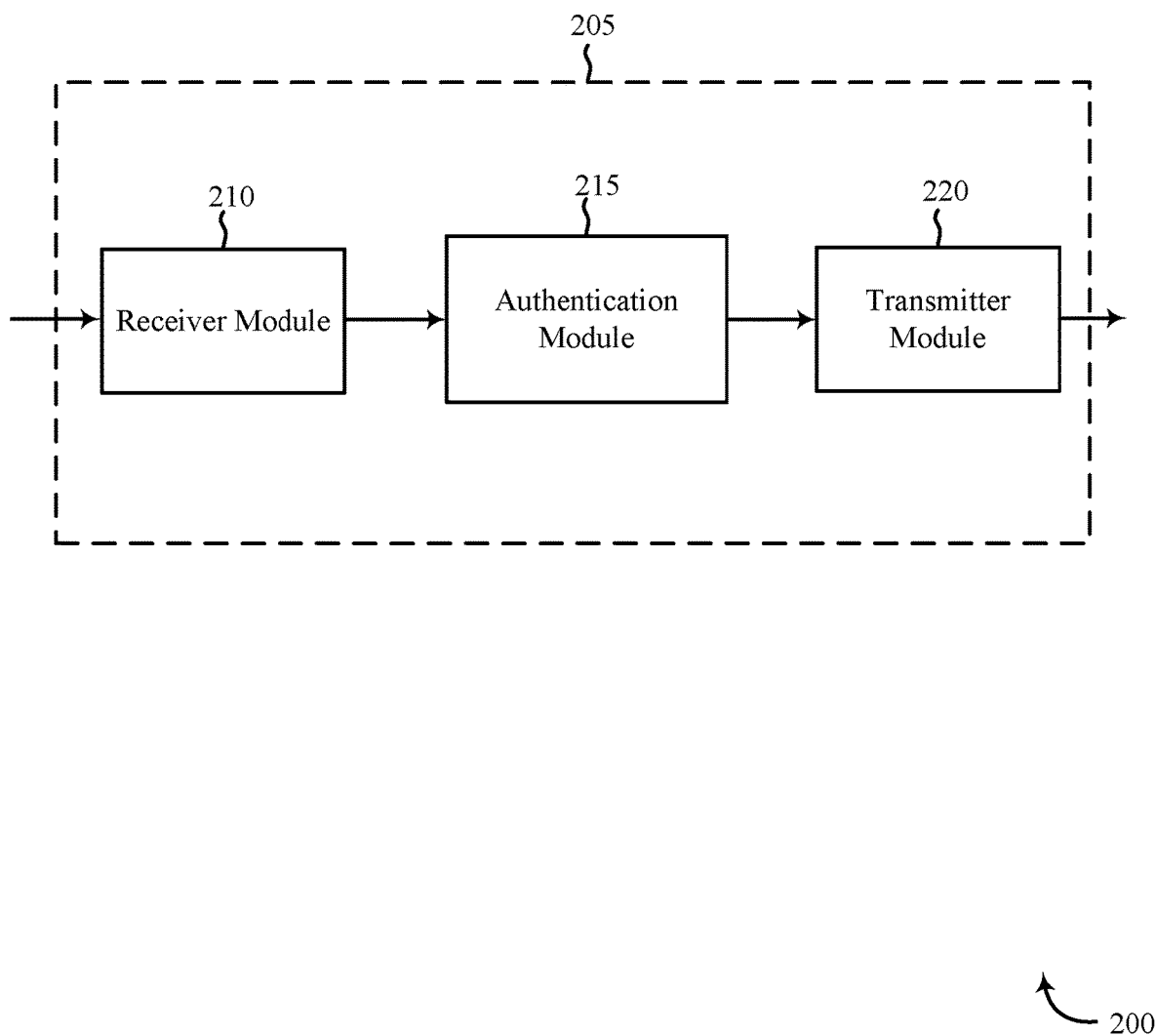
FIG. 2 shows a block diagram of a device relating to a security and/or an automation system, in accordance with various aspects of this disclosure.

FIG. 2 shows a block diagram 200 of an entry apparatus 205 for use in electronic communication, in accordance with various aspects of this disclosure. The entry apparatus 205 may be an example of one or more aspects of a local computing device 115, 120, a remote computing device 140, or a control panel 135 described with reference to FIG. 1. In one example, the entry apparatus 205 is located at an entry to a building or property. The entry apparatus 205 may include features and/or functionality that facilitate interactions with one or more persons who approach the entry. The entry apparatus 205 may include a receiver module 210, an authentication module 215, and/or a transmitter module 220. The entry apparatus 205 may also be or include a processor. Each of these modules may be in communication with each other—directly and/or indirectly.

The components of the entry apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive data related to biometric identifiers, electronic device identification, and/or presence of one or more persons. The received information may be transmitted to the authentication module 215, and to other components of the entry apparatus 205.

The authentication module 215 may operate to authenticate and/or confirm identity of one or more persons attempting to gain access to a building or property. The authentication process may involve evaluating and/or utilizing various types of input. One such input may include biometric identifiers related to the person. Another input may include identification of one or more electronic devices associated with the person. A still further input may relate to recognition of the presence of the person within a predetermined area such as approaching or in close proximity to an entrance to the building or property.

Various technologies may be used to communicate with the electronic device carried by or otherwise associated with the person. For example, at least one of Wi-Fi, radio frequency identification (RFID), geo location, and BLUETOOTH® technologies may be used to identify the electronic device. In the case of Wi-Fi technology, authentication module 215 may identify when the electronic device links with a Wi-Fi system of the building or property, which may indicate that the electronic device is within a predetermined zone or geographic range of the Wi-Fi modem. In the case of RFID technology, an RFID signal of the device may be identified, which typically also indicates relative close proximity to an RFID transceiver of the building or property. In the case of geo location technology, the electronic device may emit a GPS signal, and an identified geo location signal within a predetermined range of the building or property may indicate that the person at the building entry possesses the electronic device. BLUETOOTH® technology may have similar ability to determine location of the electronic device within a relatively small geographic zone (e.g. within a 10 ft. to 20 ft. range of a BLUETOOTH® receiver located at the building entry). In at least some of these technologies, the detecting device may be integral with the entry apparatus 205. In other examples, the detecting apparatus may be located at other locations within the building or property (e.g., at a control panel 135 or separate local computing device 115, 120).

Authentication module 215 may also obtain information indicating the presence of a person in proximity to, for example, an entry of the building or property. The proximity information may be received from, for example, a motion detector, facial recognition detector, image recognition device, or the like. The person's presence may be identified concurrently with or using a similar technology to obtaining biometric identifiers and/or identifying an electronic device of the person.

Once the person is authenticated, the system may grant access to the building or property (e.g., unlocking or otherwise opening barrier such as a door). The person may be able to automatically obtain access to the building or property without having to use a key or other manual access device. In at least some arrangements in which the barrier (e.g., door) may be automatically locked/unlocked and opened/closed, it may be possible for the person to obtain access to the building or property in a hands free manner in addition to obtaining keyless entry. Authentication module 215 may provide instructions for permitting access to the person. The instructions may include, for example, an unlock signal sent to a locking device of a door and/or an open signal sent to an opening device of the door.

In at least one embodiment, authentication module 215 authenticates a person using at least one biometric identifier, identification of at least one electronic device associated with the person, and confirmation of presence of the person. The order in which the information is collected and processed by authentication module 215 may vary. For example, an electronic device may be identified followed by confirmation that the person associated with the device is the actual person by evaluating one or more biometric identifiers of the person.

The biometric identifiers may vary depending on available technologies and desired level of participation by the person. For example, in some embodiments the person may be required to look into a scanner, place a hand or finger on a scanning surface, or stand at a predetermined location relative to a camera in order to collect the desired biometric identifiers. In other embodiments, the authentication module 215 operates to automatically obtain the desired biometric information without knowledge and/or specified participation by the person. Similarly, the identification of one or more electronic devices of the person may be based at least in part on the person's participation in the identification process. For example, the person may be required to position his/her electronic device within a predetermined area or zone, respond to a message, generate a signal, or the like. In other embodiments, authentication module 215 may operate to automatically obtain the desired device identification information via, for example, a scan, an active handshake that occurs automatically, or confirming with an operation system that a link has occurred between the electronic device and another electronic devices (e.g., a Wi-Fi modem, BLUETOOTH® receiver, geo location device, or the like) without requiring the person's knowledge or active participation.

In some embodiments, three or more inputs are used to provide the desired authentication for purposes of authorizing the person (e.g., to gain entry to the building or property). The various inputs may include two or more biometric identifiers and an identification of a single electronic device, identification of multiple electronic devices and one or more biometric identifiers, confirmation of presence along with one or more biometric identifiers and identification of at least one electronic device, or some other combination.

In some embodiments, authentication module 215 may operate through a series of steps or methods that may be arranged in the priority of most likely to authenticate to least likely to authenticate. If higher priority methods or steps are unavailable, the system may automatically move to the next step, and so forth. For example, if a facial recognition scan is not available due to the person wearing sunglasses or there being improper lighting, the system may automatically listen for a voice sample or request a voice response from the person. The order in which the various steps are taken may be based at least in part on what is easiest for the person (i.e., requires the least amount of effort and/or participation) to gain access to the building or property (e.g., what requires the least amount of effort to what requires the most amount of effort).

Operation of authentication module 215 may include an override feature. For example, authentication module 215 may, in a standard state or mode, automatically obtain the necessary biometric identifiers and identification of electronic devices. A person may opt out of the standard mode, for example, by issuing a voice command. The voice command may include, for example, specific key words that authenticate the user. In some examples, the voice command may also provide a voice sample for purposes of providing a secondary authentication of the user.

In still further examples, confirming authentication via one of the biometric identifiers and/or identification of at least one electronic device prompts scanning or activation of other components for obtaining the other of the biometric identifier and device identification. In one example, identifying an electronic device may result in activation of a camera, scanner, sensor, or the like to obtain the biometric identifiers. In other examples, the biometric identifiers and identification of an electronic device may occur concurrently.

Authenticating the person may include comparing the collected biometric identifiers to stored biometric information, and/or comparing the information received about the person's electronic device to stored device information. These comparisons may be conducted by the entry apparatus 205 and/or another device such as, for example, local computing devices 115, 120, control panel 135, or remote computing device 140. The stored information may be stored on any one of the entry apparatus 205, local computing devices 115, 120, control panel 135, or remote computing device 140, or accessible via one or more of such devices. The stored information may be in the form of user profiles. The stored information may be configured as one or more databases.

The entry apparatus 205 may include, for example, a doorbell for the building or property. The doorbell may include a camera, scanner, microphone, speakers, and other components that assist in obtaining/receiving biometric identifiers, identifying an electronic device, and/or identifying presence of the person.

The transmitter module 220 may transmit the one or more signals received from other components of the entry apparatus 205. The transmitter module 220 may transmit data related to biometric identifiers, electronic device identification, and/or presence of one or more persons. In some examples, the transmitter module 220 may be located with the receiver module 210 in a transceiver module.

Figure 3:
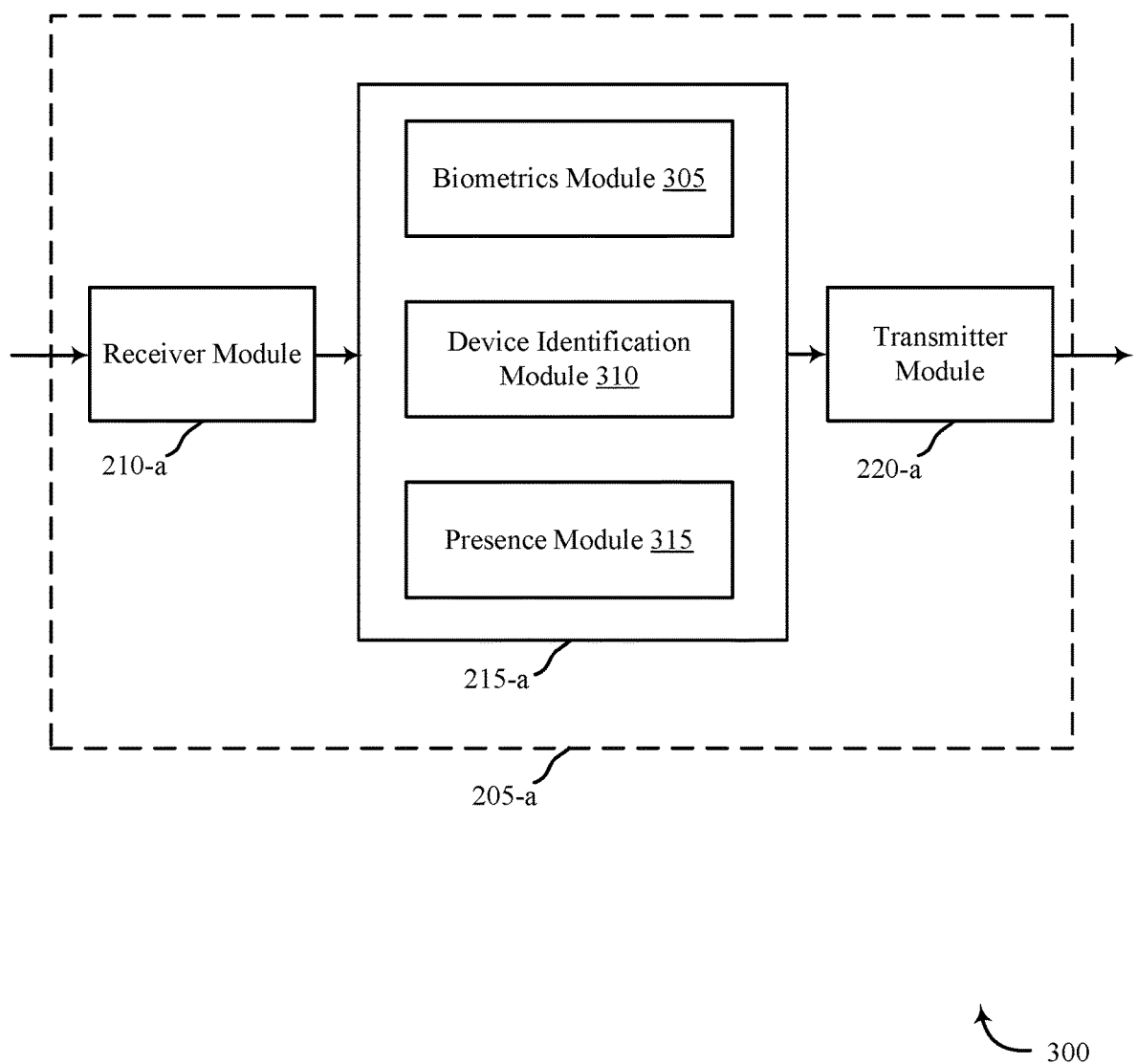
FIG. 3 shows a block diagram of a device relating to a security and/or an automation system, in accordance with various aspects of this disclosure.

FIG. 3 shows a block diagram 300 of an entry apparatus 205-*a* for use in wireless communication, in accordance with various examples. The entry apparatus 205-*a* may be an example of one or more aspects of a local computing device 115, 120, a remote computing device 140, or a control panel 135 described with reference to FIG. 1. The entry apparatus 205-*a* may also be an example of an entry apparatus 205 described with reference to FIG. 2.

The entry apparatus 205-*a* may include a receiver module 210-*a*, an authentication module 215-*a*, and/or a transmitter module 220-*a*, which may be examples of the corresponding modules of entry apparatus 205. The entry apparatus 205-*a* may also include a processor. Each of these components may be in communication with each other. The authentication module 215-*a* may include a biometrics module 305, a device identification module 310, and a presence module 315. The receiver module 210-*a* and the transmitter module 220-*a* may perform the functions of the receiver module 210 and the transmitter module 220, of FIG. 2, respectively.

The biometrics module 305 may operate to perform at least some of the steps and functions described above with respect to FIG. 2 related to collected and evaluating biometric identifiers. Biometrics module 305 may operate to obtain biometric identifiers either actively or passively. In an active method, biometrics module 305 may automatically obtain biometric identifiers via, for example, a facial recognition scan, a voice sample, or a retina scan. In a passive mode, biometrics module 305 may obtain biometric identifiers in response to a user's actions such as, for example, a spoken voice command, touching a scanning surface with a finger or hand to provide a fingerprint/handprint, or providing some other unique biometric information.

Biometrics module 305 may operate to evaluate the received biometric information. The evaluation may include processing such as conducting a look-up in databases having stored biometric information (e.g., a database of user profiles that include biometric information). The evaluating may include comparison of the obtained biometric information to stored biometric information. The evaluating may include determining whether the received biometric information is of sufficient quality or in other ways meets threshold standards in order to be compared to stored biometric information. In the event the biometric information received is not adequate, biometrics module 305 may submit a request to the person for resubmission of the biometric information.

Biometrics module 305 may generate a prompt for the person to enter biometric information. For example, biometrics module 305 may generate a light pattern, a text message, or audible message that is conveyed via the entry apparatus 205-*a*. In other examples, biometrics module 305 may deliver a message to the electronic device carried by the person to provide instructions to or otherwise prompt the person to submit biometric information or position themselves in a manner in which the biometric information may be obtained by authentication module 215-*a*.

Device identification module 310 may operate to perform the steps and functions discussed above related to identifying one or more devices associated with the person seeking to obtain access to the building or property. Device identification module 310 may identify one or more electronic devices (e.g., a mobile computing device such as a smartphone) associated with a person. The device may be carried by the person or located in relative close proximity to the person and/or an entry to the building or property. In one example, the device is associated with a vehicle such as an automobile, motorcycle, scooter, or the like. In other examples, the device is a mobile computing device such as a smartphone, an identification (ID) fob, bracelet, key card, or the like. The device may transmit an electric signal that is identified by device identification module 310. In other examples, device identification module 310 may communicate with the electronic device in other ways (e.g., transmit a text message, email, voice message, a location ping, or the like to the device). As discussed above, device identification module 310 may implement various technologies to identify the device. The technologies may cooperate with other electronic devices of the building or property such as a control panel, modem, transceiver, or the like in addition to or in place of components associated with entry apparatus 205-*a*.

Presence module 315 may operate as discussed above to provide steps or methods of detecting the presence of a person approaching or in close proximity to an entry of the building or property (e.g., adjacent to entry apparatus 205-*a*). Presence module 315 may cooperate with components or other features used to operate biometrics module 305 and/or device identification module 310. Presence module 315 may confirm presence of a person concurrently with collecting other information such as biometric identifiers and/or device identification. For example, presence module 315 may confirm presence of a person by detecting a voice, and the detected voice may be used as a voice sample that is used as a biometrics identifier for the person.

Figure 4:
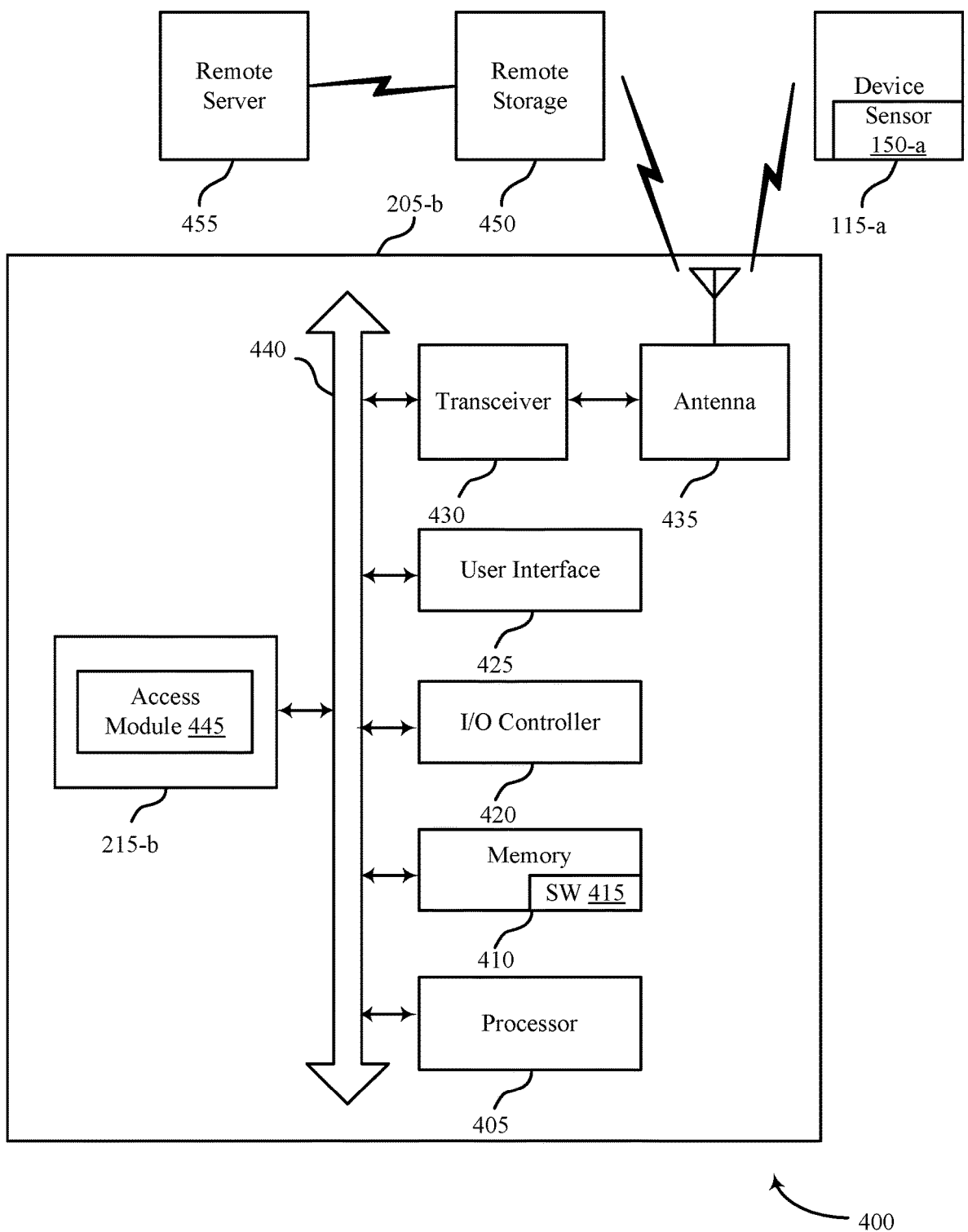
FIG. 4 shows a block diagram relating to a security and/or an automation system, in accordance with various aspects of this disclosure.

FIG. 4 shows a system 400 for use in authentication systems, such as authentication systems used to control access to a building or property, in accordance with various examples. System 400 may include an entry apparatus 205-*b*, which may be an example of the local computing device 115, 120, remote computing device 140, or control panel 135 of FIG. 1. Entry apparatus 205-*b* may also be an example of one or more aspects of entry apparatus 205 and/or 205-*a* of FIGS. 2 and 3.

Entry apparatus 205-*b* may include authentication module 215-*b*, which may be an example authentication module 215 described with reference to FIGS. 2 and 3. Authentication module 215-*b* may include an access module 445. In some embodiments, the authentication module 215-*b* may additionally include the biometrics module 305, a device identification module 310, and a presence module 315.

Entry apparatus 205-*b* may also include components for bi-directional voice and data communications including components for transmitting communications and components for receiving communications. For example, entry apparatus 205-*b* may communicate bi-directionally with one or more of local computing device 115-*a*, one or more sensors 150-*a*, remote storage 450, and/or remote server 455, which may be an example of the remote server of FIG. 1. This bi-directional communication may be direct (e.g., entry apparatus 205-*b* communicating directly with remote storage 450) or indirect (e.g., entry apparatus 205-*b* communicating indirectly with remote server 455 through remote storage 450).

The access module 445 may operate to control access to the building or property in response to the authentication determined by one or more of the biometrics module 305, a device identification module 310, and a presence module 315 described with reference to FIG. 3. For example, access module 445 may generate signals, instructions or the like for use by a locking device, latch, or opening mechanism that controls a barrier such as a door that provides access to the building or property. Access module 445 may receive instructions from other components or modules such as one of the biometrics module 305, device identification module 310, or presence module 315 of the authentication module 215-a described above with reference to FIG. 3.

In one embodiment, access module 445 maintains the barrier in a closed and/or locked state until the person is authenticated as an authorized person for access into the building or property. Access module 445 may also provide instructions or signals for operating other components of a security and/or automation system. For example, access module 445 may disarm a security feature, activate lighting, operate an HVAC system, or the like. Access module 445 may operate automatically to provide unlocking and/or opening of the barrier without the use of a key, and, in some circumstances, without the person touching the barrier. In some embodiments, local computing device 115-a may be controlled at least in part by access module 445. For example, local computing device 115-a may be a door lock or a door opening device.

Entry apparatus 205-b may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of local computing device 115-a, remote storage 450, and/or remote server 455.

The transceiver module 430 may include a modem to modulate the packets and provide the modulated packets to the one or more antennas 435 for transmission, and to demodulate packets received from the one or more antenna 435. While a control panel or a control device (e.g., entry apparatus 205-b) may include a single antenna 435, the control panel or the control device may also have multiple antennas 435 capable of concurrently transmitting or receiving multiple wired and/or wireless transmissions. In some embodiments, one element of entry apparatus 205-b (e.g., one or more antennas 435, transceiver module 430, etc.) may provide a direct connection to a remote server 455 via a direct network link to the Internet via a POP (point of presence). In some embodiments, one element of entry apparatus 205-b (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 150-a (e.g., motion, proximity, smoke, light, glass break, door, window, carbon monoxide, and/or another sensor) may connect to some element of system 400 via a network using one or more wired and/or wireless connections. In other embodiments, the sensors 150-a may collect information that is used for determining a biometric identifier such as at least one of facial recognition, voice recognition, thumbprint, fingerprint, palm print, and retina scan. In some embodiments, the sensors 150-a may be used to identify an electronic device associated with a person seeking to gain access to the building or property. The sensors 150-a may be configured to detect at least one of WiFi, radio frequency identification (RFID), geo location, and BLUETOOTH® signals, or otherwise communicate with one or more electronic devices using such technologies.

In some embodiments, the user interface module 425 may include an audio device, such as an external speaker system, an external display device such as a display screen, and/or an input device (e.g., remote control device interfaced with the user interface module 425 directly and/or through I/O controller module 420). The user interface module 425 may be located at an entry to a building or property. The user interface module 425 may facilitate some communications between a person and the communication system 400. For example, user interface 425 may communicate an audio signal to a person to look into or toward entry apparatus 205-b so the authentication module 215-b can more accurately obtain a biometric identifier. In another example, a message is displayed for the person via a display screen of user interface 425. The displayed message may include instructions, pose questions, or present images as part of communicating with the person.

One or more buses 440 may allow data communication between one or more elements of entry apparatus 205-b (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., detect a presence of at least one person positioned proximate an entry to the building or property, collect one or more biometric identifiers from the person, identify one or more devices within a predetermined proximity of the entry to the building, and/or grant the person access to the building based at least in part on the collected biometric identifiers and/or the identified devices, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the processor module 405 may include, among other things, an intelligent hardware device (e.g., a central processing unit (CPU), a microcontroller, and/or an ASIC, etc.). The memory 410 can contain, among other things, the Basic Input-Output system (BIOS) which may control basic hardware and/or software operation such as the interaction with peripheral components or devices. For example, the authentication module 215-b to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the local computing devices 115-a may include a single antenna 435, the local computing devices 115-a may have multiple antennas 435 capable of concurrently transmitting and/or receiving multiple wireless transmissions.

Figure 5:
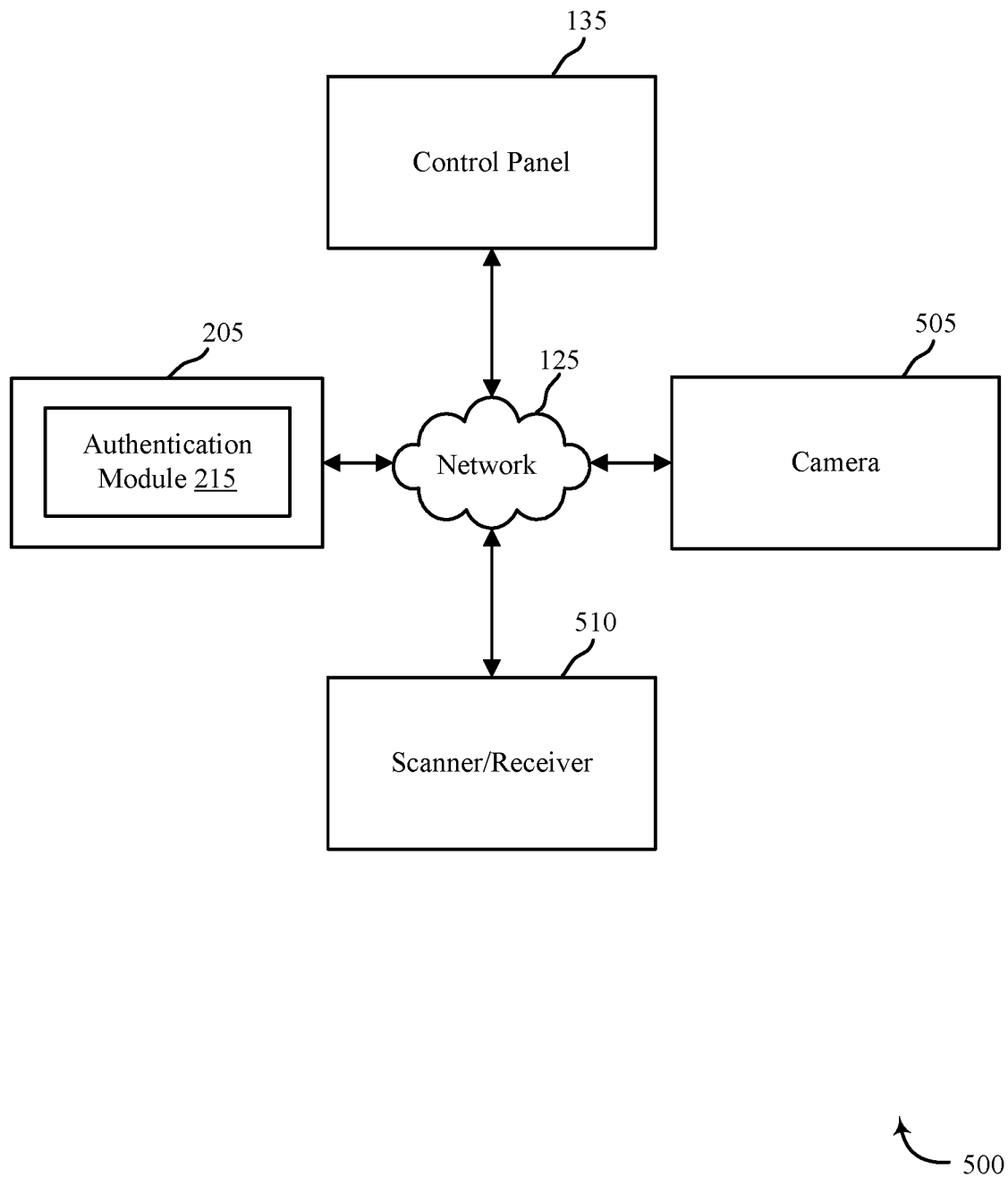
FIG. 5 shows a block diagram of an authentication apparatus relating to a security and/or an automation system, in accordance with various aspects of this disclosure.

FIG. 5 illustrates an apparatus or system 500. The system 500 includes a control panel 135, an entry apparatus 205, a camera 505, and a scanner/receiver 510, which may all communicate with each other via network 125. The control panel 135 may be one example of the control panel 135 described with reference to FIG. 1. The entry apparatus 205 may be one example of the entry apparatus 205 described with reference to FIGS. 2-4. The network 125 may be one example of the network 125 described with reference to FIG. 1.

Entry apparatus 205 may operate authentication module 215. The authentication module 215 may be one example of the authentication module 215 described above with reference to FIGS. 2-5. In some embodiments, entry apparatus 205, alone or in combination with camera 505 and scanner/receiver 510, may obtain biometric identifiers and/or identify a device associated with a person. In one example, camera 505 performs facial recognition based on images or video footage of a person wishing to gain access to a building or property. Scanner/receiver 510 may obtain other types of biometric information such as, for example, a fingerprint, a voice command or voice sample, or a retinal scan. In some embodiments, scanner/receiver 510 may operate to detect an electronic device carried by or otherwise associated with a person from whom the biometric information is collected. One or both of camera 505 and scanner/receiver 510 may operate to detect presence of a person approaching or in close proximity to an entry of the building or property (e.g., in close proximity to entry apparatus 205).

The biometric information, device identification information, and/or presence information may be transmitted to authentication module 215. Authentication module 215 may operate, for example, to authenticate the person as someone who is authorized to gain access to the building or property. Authentication module 215 may communicate information to control panel 135. Control panel 135 may conduct at least some of the processing of data (e.g., biometric identifier and the like). In some examples, control panel 135 may facilitate identification of the electronic device associated with the person via, for example, an RFID transceiver, a geo location tracking device, or a BLUETOOTH® transceiver associated with or controlled by control panel 135. In such cases, control panel 135 may communicate device identification information to authentication module 215 for use in authenticating the person. In still further examples, control panel 135 may include memory or other data storage capability to store user profiles, known biometric identifiers and/or electronic device identification information. Authentication module 215 may reference the stored information on control panel 135 as part of the authenticating the person. Ultimately, authentication module 215 may provide authorization for a person to gain access to the building or property.

Figure 6:
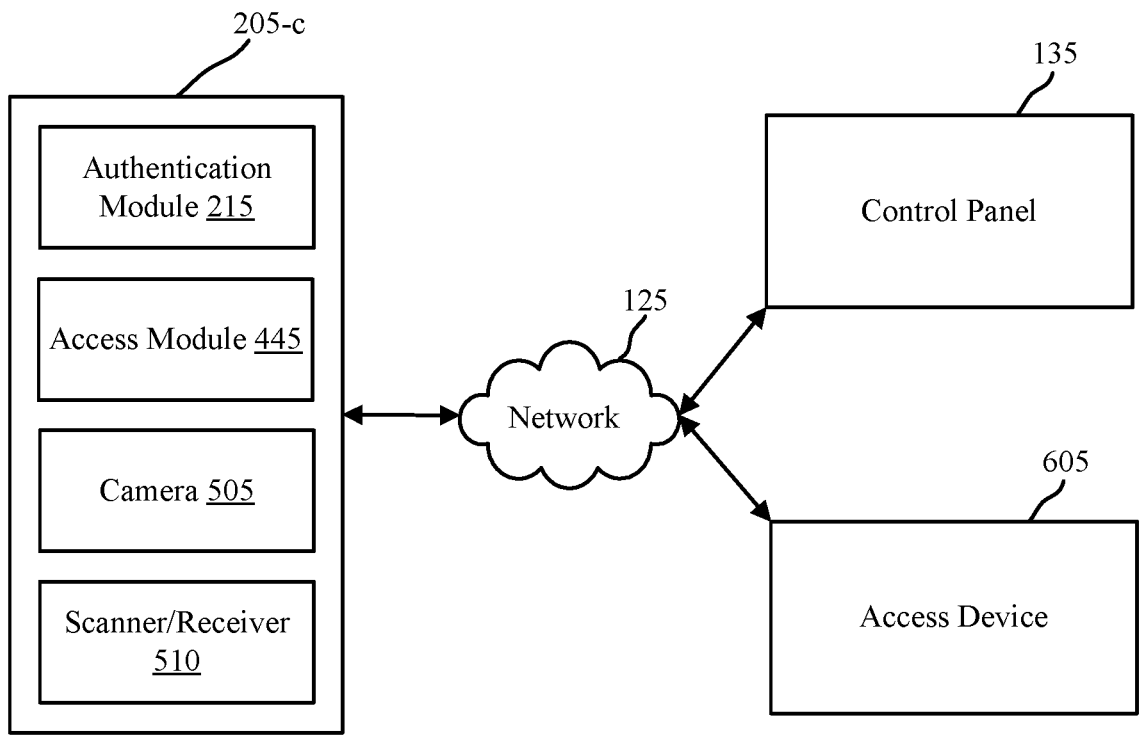
FIG. 6 shows a block diagram of an authentication apparatus relating to a security and/or an automation system, in accordance with various aspects of this disclosure.

FIG. 6 illustrates another example device or system 600 for authenticating a person attempting to gain access to a building or property and/or provide keyless entry to a building or property. System 600 includes an entry apparatus 205-c that includes an authentication module 215, an access module 445, a camera 550, and a scanner/receiver 510. System 600 may also include a control panel 135 and an access device 605. The components of system 600 may communicate with each other via network 125. The control panel 135 may be one example of the control panel 135 described with reference to FIG. 1. The entry apparatus 205-c may be one example of the entry apparatus 205 described with reference to FIGS. 2-4. The authentication module 215 may be one example of the authentication module described with reference to FIGS. 2-5. The access module may be one example of the access module 445 described with reference to FIG. 4. The camera 550 and scanner/receiver 510 may be examples of the camera 550 and scanner/receiver 510 described with reference to FIG. 5. The network 125 may be one example of the network 125 described with reference to FIG. 1.

Entry apparatus 205-c may include each of the authentication modules 215, access module 445, camera 505, and scanner/receiver 510 in a single housing. The components of entry apparatus 205-c may be arranged in a common housing. The entry apparatus 205-c may be positioned proximate an entry point to a building or property. In at least some examples, entry apparatus 205-c may include a doorbell, user interface, speaker, microphone, or the like. In at least some examples, access device 605 may also be included in the housing of entry apparatus 205-c. Camera 505 and scanner/receiver 510 may communicate directly with each other and the authentication module 215 and access module 445.

Camera 505 and scanner/receiver 510 may individually, or in combination, obtain at least one biometric identifier and information about an electronic device associated with a person. The information collected by camera 505 and scanner/receiver 510 may be used to determine presence of one or more persons separately or in association with collecting the biometric identifiers and/or identification of a device. Authentication module 215 may operate to authenticate the person. Once the person is authenticated, authentication module 215 may provide instructions via access module 445 to permit the person to gain access to the building or property. Access module 445 may communicate with access device 605 to provide the desired access. The amount of access and other rights provided to the person may be based at least in part on a stored profile and associated instructions. Such profiles and other information may be stored on, for example, control panel 135. Control panel 135 may provide other features and functionality as described above with reference to, for example, FIGS. 1, 4, and 5.

Figure 7:
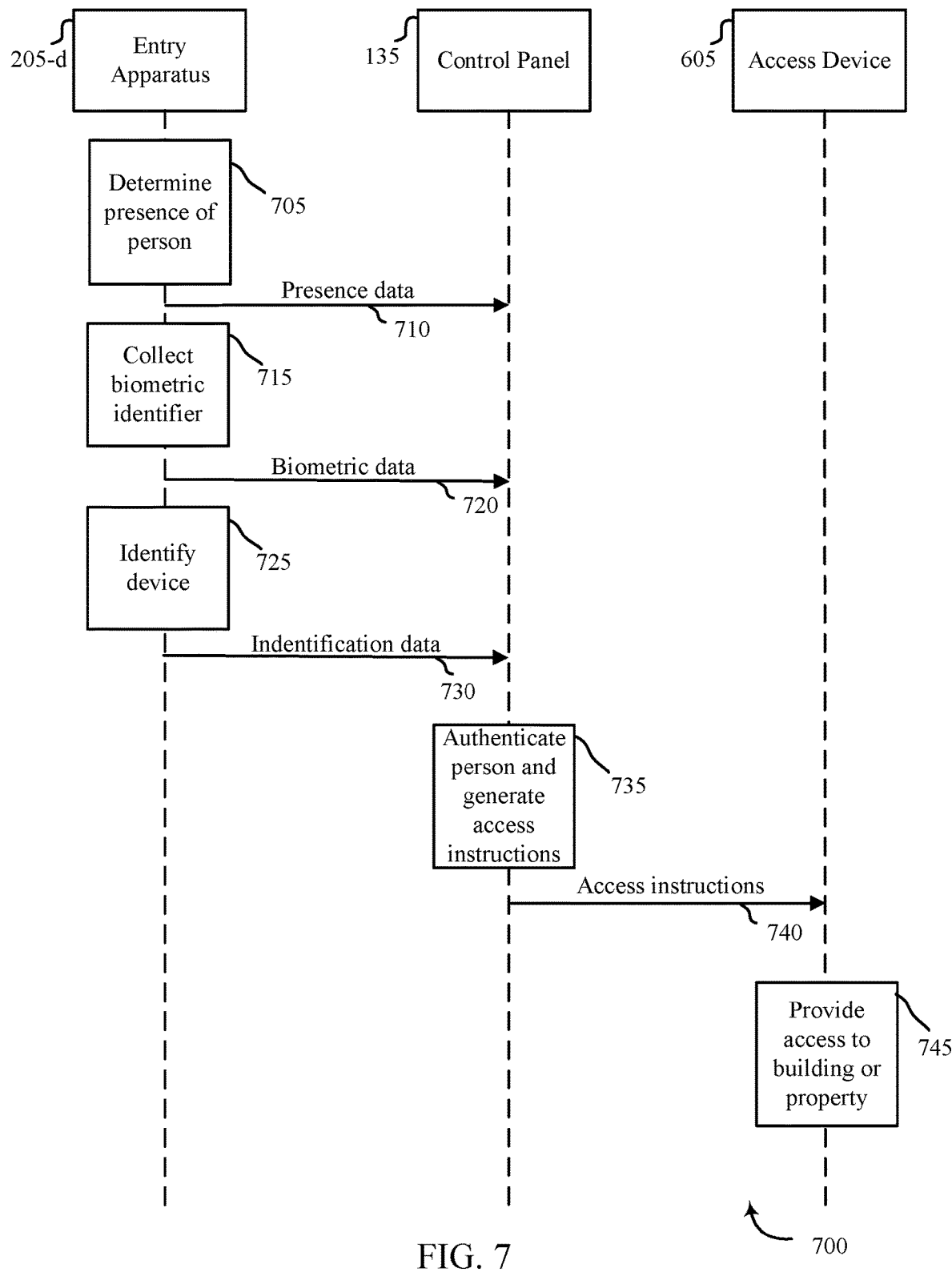
FIG. 7 shows a block diagram of an authentication apparatus relating to a security and/or an automation system, in accordance with various aspects of this disclosure.

FIG. 7 illustrates a system 700 and associated devices and components for carrying out at least some aspects of the present disclosure. System 700 includes an entry apparatus 205-d, a control panel 135, and an access device 605. The entry apparatus 205-d may be one example of the entry apparatus 205 described above with reference to FIGS. 2-6. Control panel 135 may be one example of the control panel 135 described above with reference to at least FIGS. 1, 5, and 6. Access device 605 may be one example of the access device 605 described above with reference to FIG. 6.

System 700 includes entry apparatus 205-d determining presence of a person at block 705. Determining presence of a person may include distinguishing between various types of objects, movements, and the like. Presence data 710 is transmitted to control panel 135. Entry apparatus 205-d also collects at least one biometric identifier at block 715. The one or more biometric identifiers may include at least one of facial recognition, voice recognition, thumbprint, fingerprint, palm print, and retina scan. Biometric data 720 is also transferred to control panel 135. Entry apparatus 205-d may identify at least one device at block 725. Identification data 730 is transmitted to control panel 135. Control panel 135 may authenticate a person and generate access instructions at block 735. Access instruction 740 are transmitted to access device 605. Access device 605 may provide access to a building or property at block 745. Providing access may include, for example, unlocking a barrier (e.g., door), opening a barrier, disarming a securing feature, or the like.

Figure 8:
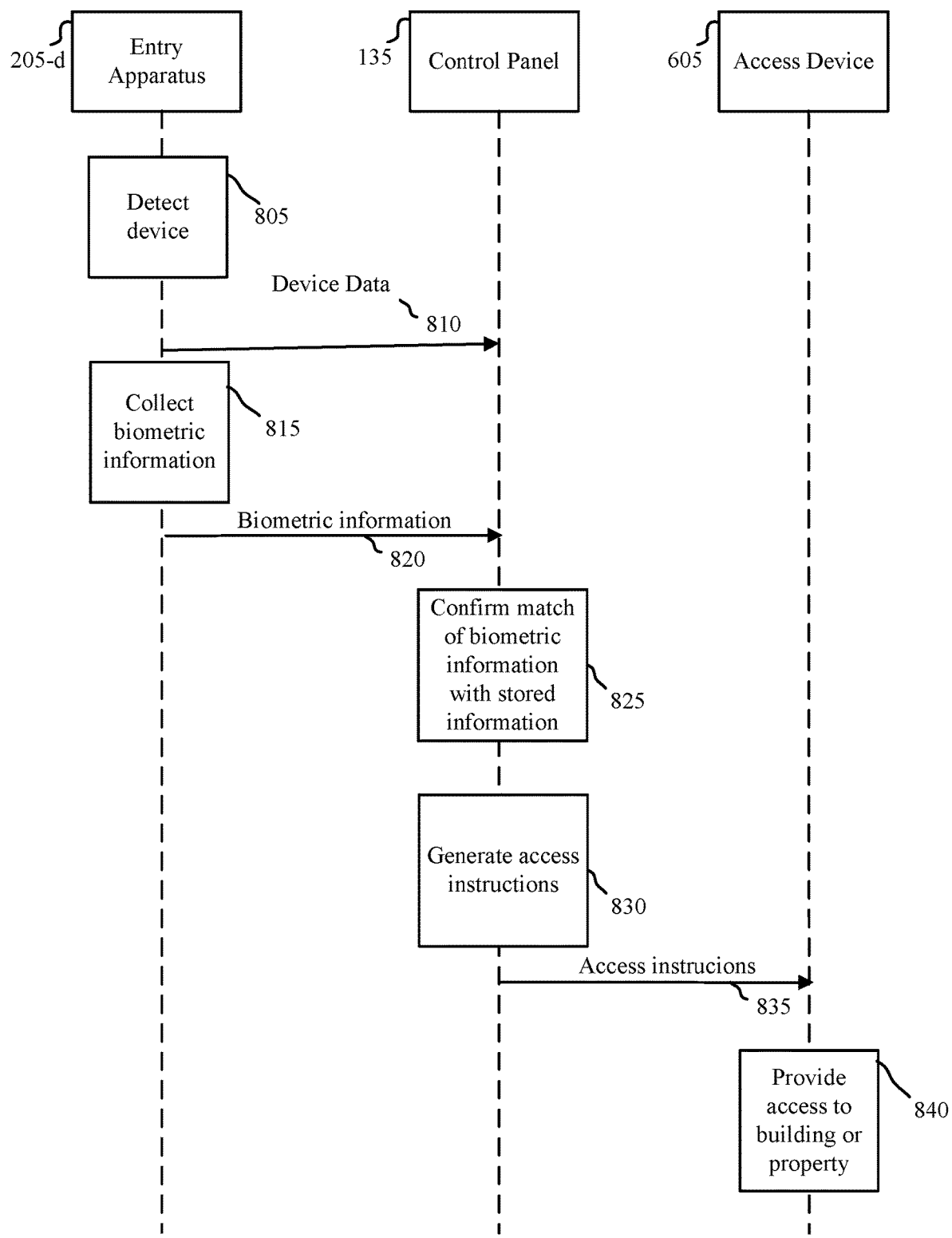
FIG. 8 shows a block diagram of an authentication apparatus relating to a security and/or an automation system, in accordance with various aspects of this disclosure.

FIG. 8 illustrates a system 800 including entry apparatus 205-d, control panel 135, and access device 605. Entry apparatus 205-d may be one example of the entry apparatus 205 described above with reference to FIGS. 2-6. Control panel 135 may be one example of the control panel 135 described with reference to FIGS. 1, 5 and 6. Access device 605 may be one example of the access device 605 described with reference to FIG. 6.

System 800 includes entry apparatus 205-d detecting a device (e.g., electronic device associated with a person) at block 805. Device data 810 is transmitted to control panel 135. Entry apparatus 205-d may collect biometric information at block 815. Biometric information 820 is transferred to control panel 135. Control panel 135 confirms a match of biometric information with stored information at block 825. Control panel 135 generates access instructions at block 830. Access instructions 835 are delivered to access device 605. Access device 605 provides access to the building or property at block 840.

Figure 9:
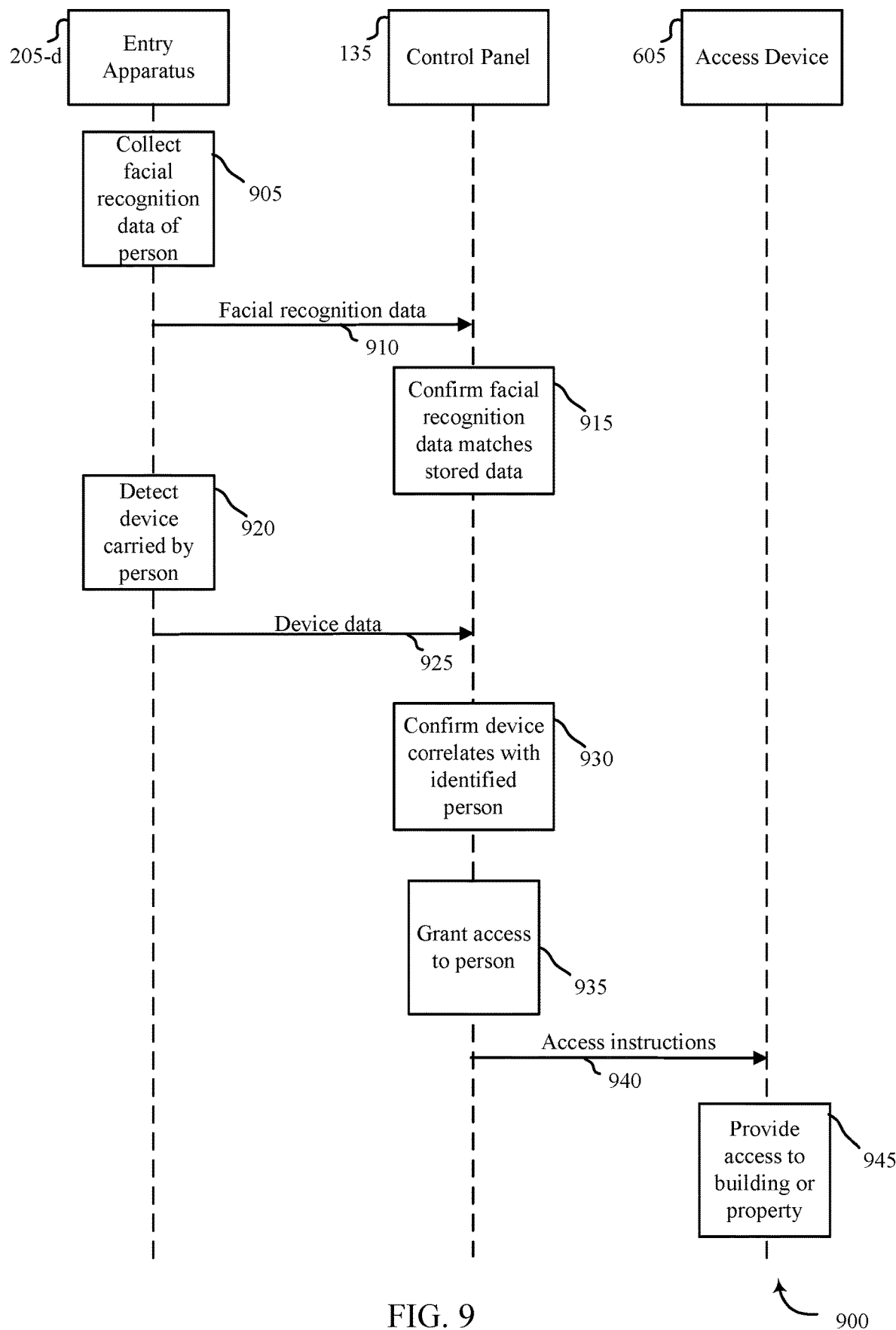
FIG. 9 shows a block diagram of an authentication apparatus relating to a security and/or an automation system, in accordance with various aspects of this disclosure.

FIG. 9 illustrates another system 900 that includes entry apparatus 205-d, control panel 135, and access device 605. Entry apparatus 205-d may be one example of the entry apparatus 205 described with reference to FIGS. 2-6. Control panel 135 may be one example of the control panel 135 described with reference to FIGS. 1, 5 and 6. Access device 605 may be one example of the access device 605 described with reference to FIG. 6.

System 900 includes collecting facial recognition data of a person at block 905 by entry apparatus 205-d. Facial recognition data 910 is delivered to control panel 135. Control panel 135 confirms facial recognition data matches stored data at block 915. Entry apparatus 205-d may detect a device carried by the person at block 920. Device data 925 is delivered to control panel 135. Control panel 135 confirms that the device correlates with the identified person at block 930. Control panel 135 grants access to a person at block 935. Access instructions 940 are delivered to access device 605, which provides access to a building or property at block 945. The facial recognition data may be collected using a camera or other device associated with entry apparatus 205-d. The electronic device of the person may be detected using various technologies, some of which are operated using entry apparatus 205-d, wherein other technologies operate at least in part with other devices or components associated with the building or property. Although various functions are shown being conducted by control panel 135 in FIG. 9, at least some of those functions may be conducted at least in part by entry apparatus 205-d.

Figure 10:
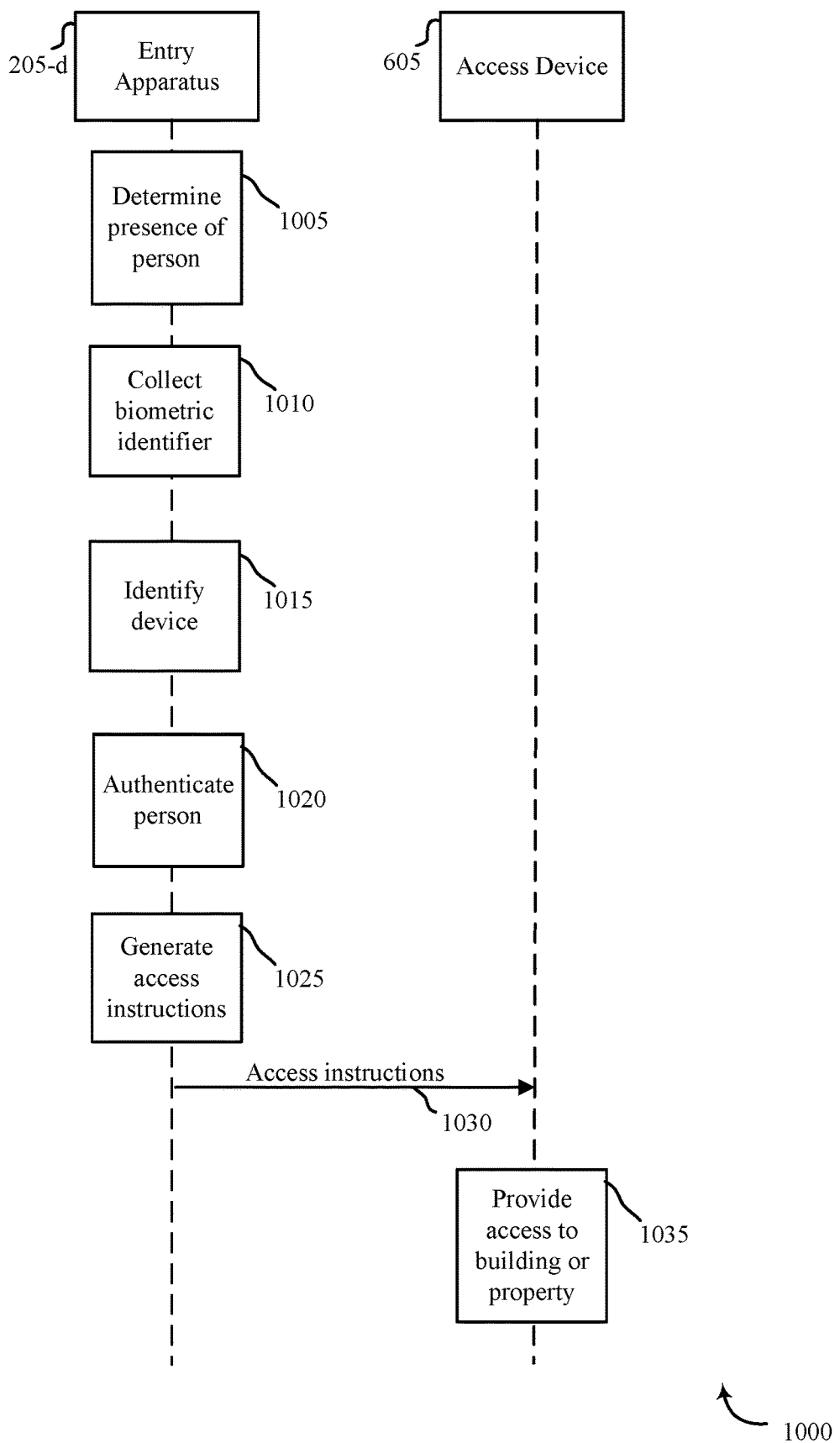
FIG. 10 shows a block diagram of an authentication apparatus relating to a security and/or an automation system, in accordance with various aspects of this disclosure.

FIG. 10 illustrates a system 1000 that includes an entry apparatus 205-d and access device 605. Entry apparatus 205-d may be one example of the entry apparatus 205 described above with reference to FIGS. 2-6. Access device 605 may be one example of the access device 605 described with reference to FIG. 6.

Entry apparatus 205-d may operate to determine presence of a person at block 1005. Entry apparatus 205-d may collect biometric identifiers at block 1010. Entry apparatus 205-d may identify a device, such as an electronic device carried by the person to which the biometric identifiers relate at a block 1015. Entry apparatus 205-d may authenticate the person at block 1020 using, for example, the collected biometric identifiers and the identified device. Entry apparatus 205-d generates access instructions at block 1025. Access instructions 1030 are delivered to access device 605. Access device 605 provides access to the building or property at block 1035.

In at least some embodiments, any of the functions described with reference to blocks 1005, 1010, 1015, 1020, 1025 may be performed at least in part on another device or component of system 1000 (e.g., a control panel or local computing device).

Figure 11:
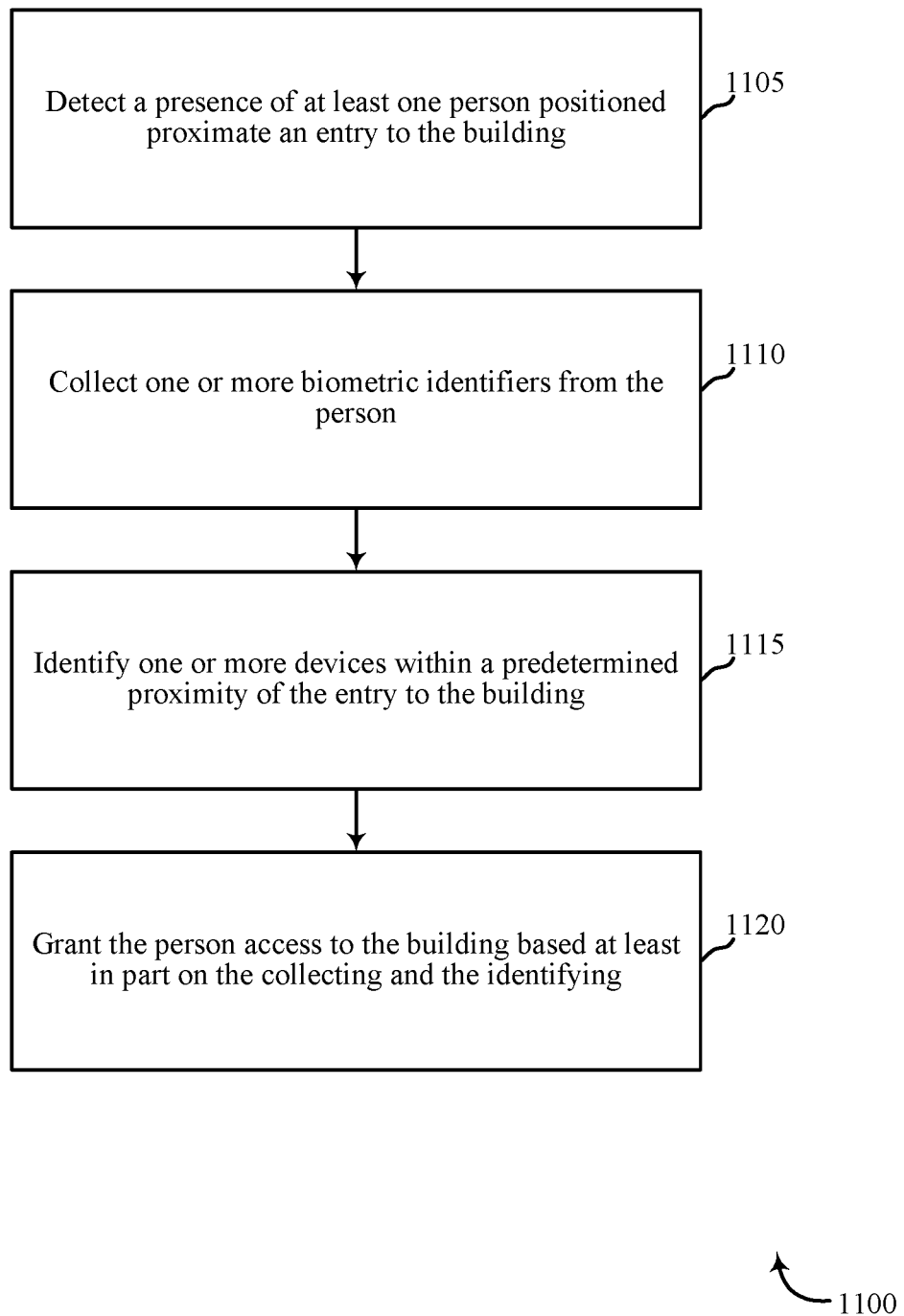
FIG. 11 is a flow chart illustrating an example of a method relating to a security and/or an automation system, in accordance with various aspects of this disclosure.

FIG. 11 is a flow chart illustrating an example of a method 1100 for controlling access to a building associated with a security and/or automation system, in accordance with various aspects of the present disclosure. For clarity, the method 1100 is described below with reference to aspects of one or more of the systems described with reference to FIGS. 1 and 4-10, and/or aspects of one or more of the apparatuses or devices described with reference to FIGS. 1-10. In some examples, a computing device such as the entry apparatus 205 of FIGS. 2-10 may execute one or more sets of codes to control the functional elements of the authentication module 215 of FIGS. 2-6 to perform the functions described below. Additionally or alternatively, the entry apparatus 205 may perform one or more of the functions described below using special-purpose hardware.

At block 1105, the method 1100 may include detecting presence of at least one person positioned proximate an entry to the building. Block 1110 includes collecting one or more biometric identifiers from the person. Block 1115 includes identifying one or more devices within a predetermined proximity of the entry to the building. Block 1120 includes granting the person access to the building based at least in part on the collecting and identifying of steps of blocks 1110 and 1115.

The operation(s) at block 1105 may be performed using the authentication module 215 described with reference to FIGS. 2-6. Thus, the method 1100 may provide for authentication of persons seeking access to a building or property. The method 1100 may provide for hands free or keyless entry to a building or property. The method 1100 may relate to operation of automation/security systems or components thereof. It should be noted that the method 1100 is just one implementation and that the operations of the method 1100 may be rearranged or otherwise modified such that other implementations are possible.

Figure 12:
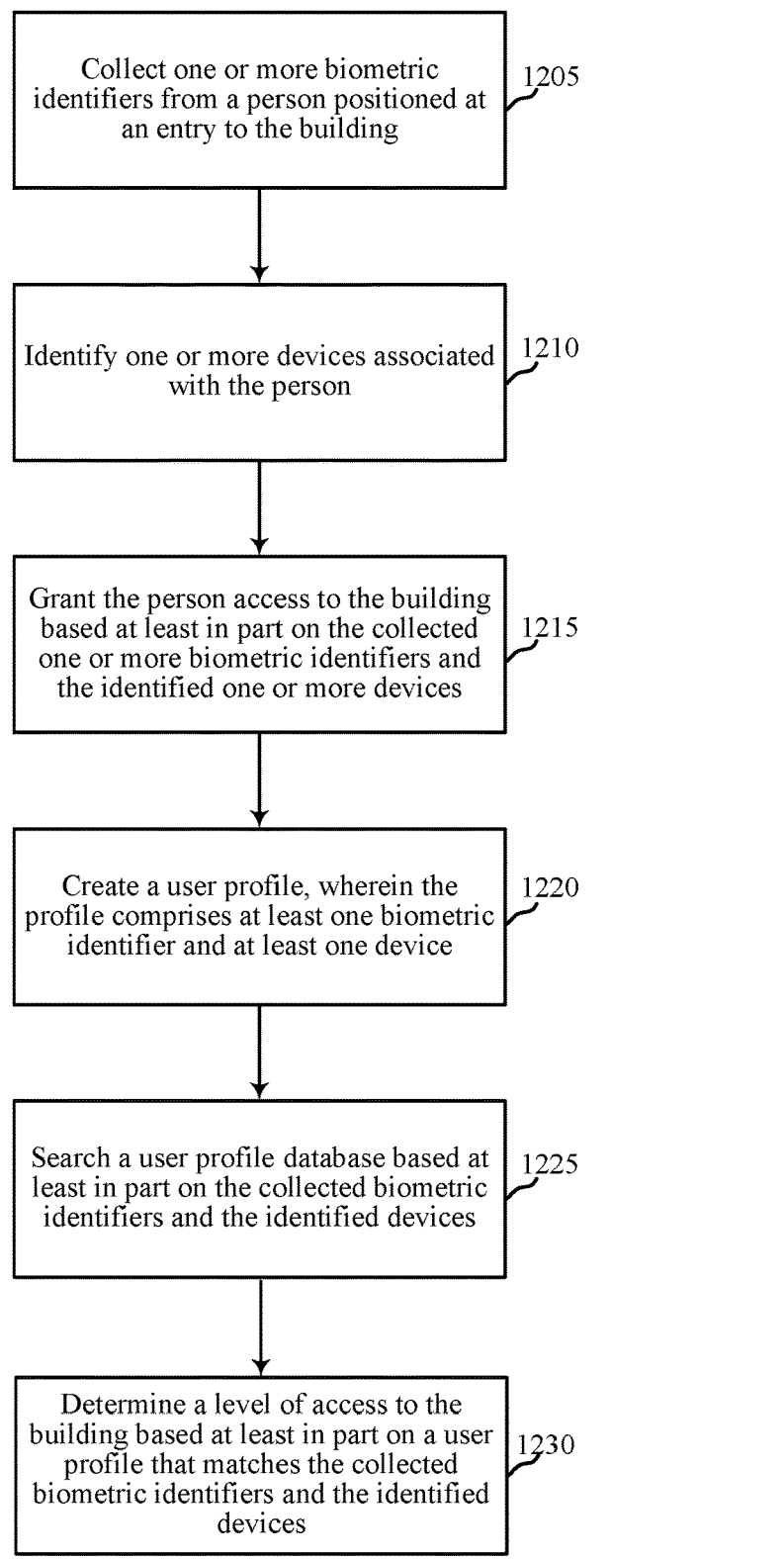
FIG. 12 is a flow chart illustrating an example of a method relating to a security and/or an automation system, in accordance with various aspects of this disclosure.

FIG. 12 is a flow chart illustrating an example of a method 1200 for controlling access to a building associated with a security and/or automation system, in accordance with various aspects of the present disclosure. For clarity, the method 1200 is described below with reference to aspects of one or more of the systems described with reference to FIGS. 1 and 4-10, and/or aspects of one or more of the apparatuses or devices described with reference to FIGS. 1-10. In some examples, a computing device such as the entry apparatus 205 of FIGS. 2-10 may execute one or more sets of codes to control the functional elements of the authentication module 215 of FIGS. 2-6 to perform the functions described below. Additionally or alternatively, the entry apparatus 205 may perform one or more of the functions described below using special-purpose hardware.

At block 1205, the method 1200 may include collecting one or more biometric identifiers from a person positioned at an entry to the building. Block 1210 includes identifying one or more devices that are associated with the person. Block 1215 includes granting the person access to the building based at least in part on the collected one or more biometric identifiers and the identified one or more devices. Block 1220 includes creating a user profile, wherein the profile comprises at least one biometric identifier and information about at least one device. Block 1225 includes searching a user profile data base based at least in part on the collected biometric identifiers and the identified devices. Block 1230 includes determining a level of access to the building based at least in part on a user profile that matches the collected biometric identifiers and the identified devices.

The operation(s) at block 1205 may be performed using the authentication module 215 described with reference to FIGS. 2-6. Thus, the method 1200 may provide for authentication of persons seeking access to a building or property. The method 1200 may provide for hands free or keyless entry to a building or property. The method 1200 may related to operation of automation/security systems or components thereof. It should be noted that the method 1200 is just one implementation and that the operations of the method 1200 may be rearranged or otherwise modified such that other implementations are possible.

In some examples, aspects from two or more of the methods 1100, 1200 may be combined and/or separated. It should be noted that the methods 1100, 1200 are just example implementations, and that the operations of the methods 1100, 1200 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. An apparatus for controlling access to a building associated with a security and/or automation system, comprising:
    a processor;
    memory in electronic communication with the processor; and
    instructions stored in the memory, the instructions being executable by the processor to:
       detect a presence of a person positioned at an entry to the building using one or more biometric identifiers, wherein the one or more biometric identifiers uniquely identify the at least one person;
       collect the one or more biometric identifiers from the person;
       identify at least two devices carried by the person;
       search a user profile database based at least in part on the collected one or more biometric identifiers and the identified at least two devices;
       locate the user profile that matches the collected one or more biometric identifiers and the identified at least two devices; and
       grant the person access to the building based at least in part on the located user profile that matches both the one or more biometric identifiers and the at least two more devices.

2. The apparatus of claim 1, wherein the instructions are executable by the processor to collect the one or more biometric identifiers using at least one of a camera, a scanner, and a microphone.

3. The apparatus of claim 1, wherein the instructions are executable by the processor to identify the at least two devices using at least one of WiFi, radio frequency identification (RFID), geo location, and BLUETOOTH® signals.

4. The apparatus of claim 1, wherein the one or more biometric identifiers include at least one of facial recognition, voice recognition, thumbprint, fingerprint, palm print, and retina scan.

5. The apparatus of claim 1, wherein the instructions are executable by the processor to collect the one or more biometric identifiers before identifying the at least two devices.

6. The apparatus of claim 1, wherein the instructions are executable by the processor to collect one or more biometric identifiers after identifying the at least two devices.

7. The apparatus of claim 1, wherein the instructions are executable by the processor to detect presence of the person before collecting one or more biometric identifiers.

8. A computer-implemented method for controlling access to a building associated with a security and/or automation system, comprising:

detecting a presence of at least one person positioned proximate an entry to the building using one or more biometric identifiers, wherein the one or more biometric identifiers uniquely identify the at least one person;

collecting the one or more biometric identifiers from the at least one person;

identifying at least two devices within a predetermined proximity of the entry to the building;

searching a user profile database based at least in part on the collecting and the identifying;

locating the user profile that matches the one or more biometric identifiers and the at least two devices; and granting the at least one person access to the building based at least in part on the locating the user profile that matches both the one or more biometric identifiers and the at least two devices.

9. The computer-implemented method of claim 8, further comprising:

creating a user profile, wherein the user profile comprises at least one biometric identifier and one device.

10. The computer-implemented method of claim 8, further comprising:

determining a level of access to the building based at least in part on the locating.

11. The computer-implemented method of claim 10, further comprising:

denying access to the building based at least in part on the determining.

12. The computer-implemented method of claim 8, wherein the one or more biometric identifiers include at least one of facial recognition, voice recognition, thumbprint, fingerprint, palm print, and retina scan.

13. The computer-implemented method of claim 8, wherein identifying the at least two devices comprises using at least one of WiFi, radio frequency identification (RFID), geo location, and BLUETOOTH® technology.

14. The computer-implemented method of claim 8, wherein the identifying occurs before the collecting.

15. The computer-implemented method of claim 8, wherein collecting includes collecting at least two biometric identifiers.

16. The computer-implemented method of claim 8, wherein collecting is performed with at least one device positioned proximate a doorbell of the building.

17. The computer-implemented method of claim 8, wherein granting the at least one person access to the building comprises:

at least one of unlocking a door and opening the door.

18. A non-transitory computer-readable medium storing computer-executable code for controlling access to a building associated with a security and/or automation system, the code executable by a processor to:

detect a presence of at least one person positioned proximate an entry to the building using one or more biometric identifiers, wherein the one or more biometric identifiers uniquely identify the at least one person;

collect the one or more biometric identifiers from the at least one person;

identify at least two devices within a predetermined proximity of the entry to the building based at least in part on a radio frequency identification (RFID) signal from the at least two devices;

search a user profile database based at least in part on the collected one or more biometric identifiers and the identified at least two devices;

locate the user profile that matches the collected one or more biometric identifiers and the identified at least two devices; and grant the at least one person access to the building based at least in part on the located user profile that matches both the one or more biometric identifiers and the at least two devices.

19. The non-transitory computer-readable medium of claim 18, wherein the code is executable by the processor to:

detect the presence concurrently with collecting the one or more biometric identifiers.

\* \* \* \* \*